Aug. 2, 1927.
R. B. WOODCOCK ET AL
1,637,506
SOLE PRESSING MACHINE
Filed Feb. 5, 1924
2 Sheets-Sheet 2
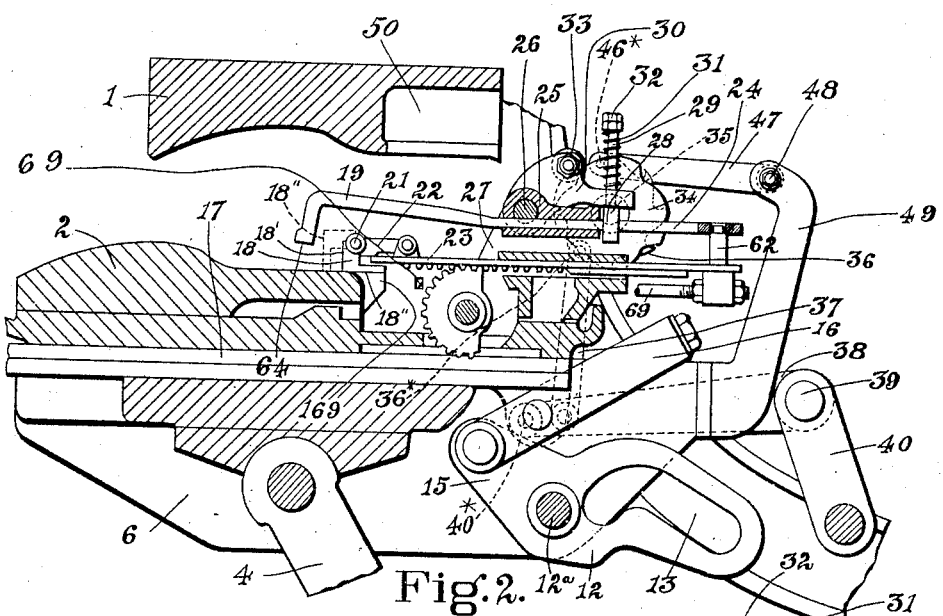
Fig. 2.
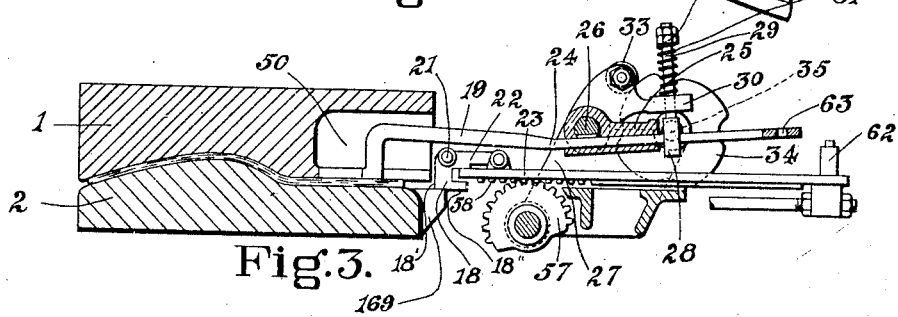
Fig. 3.
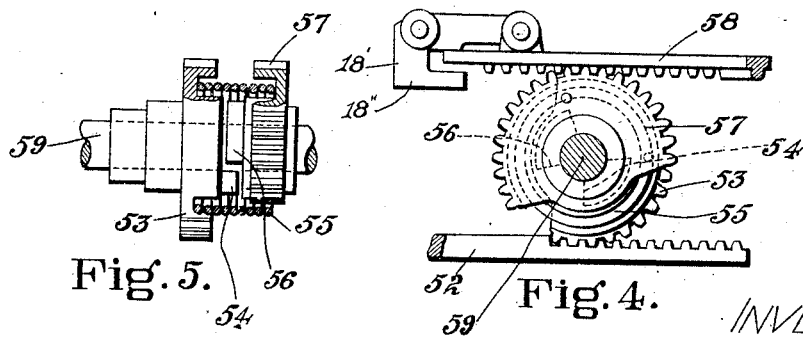
Fig. 5.
Fig. 4.
INVENTORS
Reginald Boyd Woodcock
Ernest Hoffe
By their Attorney
Nelson W. Howard Patented Aug. 2, 1927.

1,637,506

UNITED STATES PATENT OFFICE.

REGINALD BOYD WOODCOCK, AND ERNEST HOPE, OF LEICESTER, ENGLAND, ASSIGNORS TO UNITED SHOE MACHINERY CORPORATION, OF PATERSON, NEW JERSEY, A CORPORATION OF NEW JERSEY.

SOLE-PRESSING MACHINE.

Application filed February 5, 1924, Serial No. 690,772, and in Great Britain February 9, 1923.

This invention relates to machines for use in the manufacture of boots and shoes for pressing or molding soles, and has more particular reference to means for determining the proper relation of a sole to the pressing or molding means or for holding it in proper position. The invention is herein illustrated in its application to a machine of the same general type as that shown in United States Letters Patent No. 1,277,769 granted on September 3, 1918 upon an application of W. C. Stewart, but it is to be understood that in its more general aspects the invention is not limited to machines of that particular type.

The sole molding machine has proved to be a very dangerous one. It is necessary, in order to avoid the production of poor work, to place the sole very accurately in the machine. The machine as ordinarily constructed has a stationary upper mold and a movable lower mold upon which the sole is placed by the operator after which the machine moves the lower mold toward the upper mold and compresses the sole. The movement of the sole carrying mold has a tendency to disturb the positioning of the sole on that mold, and in order to keep the operator from realining a sole after the mold begins to move and thereby running great risk of injuring himself, clamping devices have been provided to hold the sole in proper position upon the lower mold, thus removing the necessity for interference and the temptation to the operator to interfere with the sole after he has once placed it. Suitable gaging devices including an end gage have also been provided in order to enable him to position the sole properly in the first place.

In sole molding machines of the above mentioned type as heretofore constructed, only a part of the sole has been molded. The lower mold corresponds in contour to an entire sole, but the upper mold is shortened at its rear end so that the pressing operation involves only the forepart and the shank portion generally of the sole, the heel seat remaining unmolded. The clamping and end gaging mechanisms above mentioned have been arranged to contact with the sole in this unmolded portion, are therefore positioned behind the shortened upper mold and are thus not interfered with by the relative movement of approach of the molds.

Under certain conditions and with some kinds of work, it has come to be regarded as advisable to mold the entire sole, including the heel seat portion, and it is desirable also that a sole molding machine should be capable of dealing with a wide range of conditions, and of molding the whole or part of a complete sole, or a short sole, with equal facility. It is therefore an important object of the present invention to provide an improved sole molding machine in which such wide range of conditions can be properly and conveniently met. Obviously such a machine, at least when molding an entire sole, will have to be provided with two full length molds, upper as well as lower, and accordingly a second important object of the invention is the provision of improved gaging and clamping mechanisms for such a machine in order that none of the advantages of accurate work positioning or safety to the operator inherent in prior machines may be sacrificed.

Considering the invention somewhat more specifically, it will be apparent that when a full length upper mold is used, the gage or sole positioning mechanism and the clamping mechanism which, as illustrated, project within the mold contours, must be protected from injury as the molds close together. To this end, an important feature of the invention consists in a sole molding machine having a pair of co-operating molds and a gage for one end of the sole to position the sole relatively to the molds, which is withdrawn from operative position as the molds are brought together. This prevents interference between the gage mechanism and a full-length upper mold, if present. In combination with a retractible gage the invention further provides a construction whereby a clamp engaging the sole within the area to be molded is protected from injury, the construction shown comprising a recess or slot in the upper mold which receives the clamp when the molding pressure is applied.

In order to insure against damage to the clamping or gaging mechanism, or both, when the molds are changed due to the fact that the operator might forget to adjust them properly when the new molds are of different length or shape or have a slot of different length from the old, it has been found advisable to provide for the automatic shifting of such mechanism out of harm's way in order to prevent inadvertent injury to it before the operator himself properly adjusts it. To this end another feature of the invention consists in novel means for this purpose, the construction shown comprising a sole-positioning gage and a clamp for holding the positioned sole for the action of the molds, which clamp and gage are adjustable relatively to the mold holding devices lengthwise of the molds according to variations in the work to be molded, and means acted upon by one of the molds to determine that in no case shall the said adjustment cause the clamp and gage to be positioned more than a certain distance within one end of a mold held by the corresponding mold holding device.

Still a further feature of the invention consists in the combination of a gage and a clamp for a work-piece of sheet stock jointly adjustable in the machine, for example in the general direction of the plane of the sheet of stock, the construction shown also comprising means for breaking the connection between the gage and clamp during operation of the machine to permit the gage to retire from the path of a mold while leaving the clamp in adjusted position.

The above and other objects and features of the invention, including also a novel form of sole gage, will become fully evident to those skilled in the art from a consideration of the following description of one convenient construction embodying the invention.

In the accompanying drawings,

Fig. 2 is a side elevation, on a larger scale and partly in section, showing some of the mechanism of Fig. 1 in position to receive a sole;

Fig. 3 shows some of the parts shown in Fig. 2 when in sole pressing position;

Fig. 4 is a side elevation, partly in section, of gage adjusting and operating mechanism of the machine;

Fig. 5 is a front elevation, partly in section, of a portion of the mechanism shown in Fig. 4;

Figures 1, 6, 7:
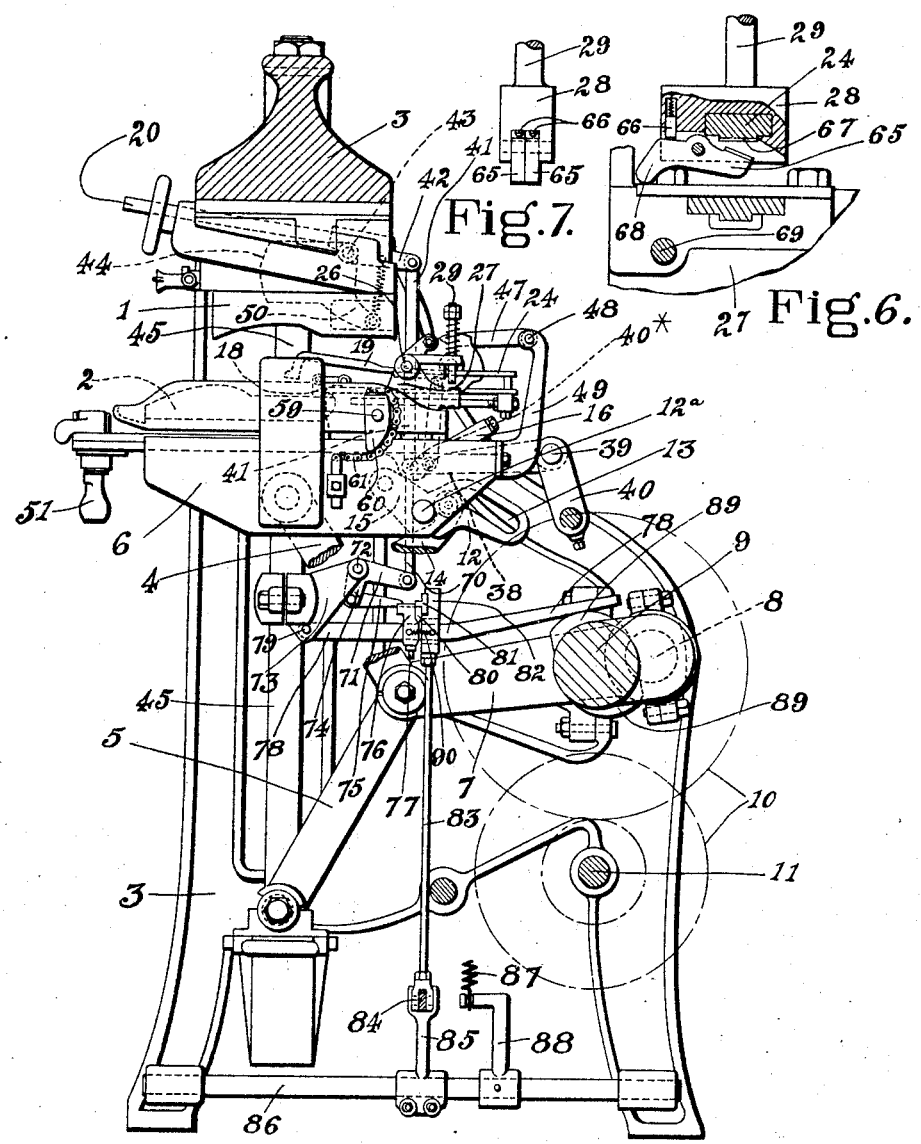
Fig. 1 is a side elevation, partly in section, of a sole molding machine embodying the invention in one form.
Fig. 6 is a detail showing locking mechanism for a sole clamp of the machine.
Fig. 7 is a side elevation of part of the locking mechanism.

In this machine two pairs of molds consisting of upper and lower molds 1 and 2 are arranged side by side with the longitudinal axes of the mold pairs extending from front to back of the machine and parallel to each other. Only one such pair and its operating mechanism are herein shown. The molds 1 and 2 are arranged so that the tread face of the sole being molded is uppermost and the upper molds 1 are fixed in the machine frame 3. The lower molds 2 are raised and lowered alternately (so that one sole is being molded while another is being withdrawn and replaced by a fresh sole) by toggle mechanisms. Each toggle mechanism comprises toggle links 4 and 5 the link 4 being pivotally connected at its upper end to a cross-head 6 which supports the lower mold 2 and at its lower end to the upper end of the toggle link 5 which at its lower end is pivotally supported on the frame 3. A link 7 is pivotally connected at one end to the joint of the toggle links 4 and 5 and at the other end to a crank 8 formed on a shaft 9 rotatably mounted in bearings on the frame 3. The shaft 9 is driven through gearing (indicated by dot-and-dash lines 10) from a driving shaft 11 also rotatably mounted in bearings on the frame 3.

In connection with each toggle mechanism there is provided a linkage for moving the lower mold forwardly to present a molded sole for removal and backwardly into line with the upper mold.

Each linkage comprises a lever 12 (Figs. 1 and 2) pivoted to the cross-head 6 at 12$^a$ and having a cam slot 13 which receive a cam roll carried on an arm 14 extending rearwardly from the toggle link 4. The lever 12 has an arm 15 which is connected by a link 16 (see the parts 58, 60 shown more in detail in U. S. Patent No. 1,277,769, above referred to), to a slide 17 to which the lower mold is secured and which is arranged to slide in horizontal guideways on the cross-head 6. The link 16 is yieldingly connected to the slide 17 as clearly shown in the said patent so as to permit a small relative lengthwise movement of the molds as they come together.

The machine has clutch mechanism (not shown) automatically stopping the machine first with one pair of molds exerting molding pressure (and the other mold pair separated and the lower mold thereof in the forward position) and then with the other pair in this condition, each operation of the clutch control member causing operation of the machine to a point only where these conditions are reversed, as is common in twin machines of this type.

Each carriage or slide 17 on which a lower mold 2 is carried forwardly and backwardly has mounted thereon at the rear of the lower mold (see Figs. 2 and 3) an end gage 18 (the mounting and operation of which will be described below) against which the operator positions the rear end of the sole and, operatively related thereto, a sole clamp 19 adapted to be brought down, by the movement by the operator of a control handle 20, upon the positioned sole near the rear end, this clamp then remaining in action while the mold retires and during the molding pressure, as will be later explained, it being automatically released on the next forward movement of the mold.

The gage 18 has two operative faces 18′ and 18″ the former for use when operating upon whole soles and the other when operating upon short soles. The gage is pivotally connected at 21 to a link 22 pivoted to a bar 23. The gage may be manually swung about its pivotal connection 21 to bring either face 18′ or 18″ into operative position. (See dotted lines in Fig. 2.)

The clamp 19 is formed at the end of a rearwardly extending bar 24 slidingly mounted in an arm 25 pivoted on a shaft 26 which is fixed in a bracket 27 fixed to the lower mold carrying slide 17. The bar 24 also passes through the rectangular end 28 of a rod 29 which passes upwardly through an arm 30 pivotally mounted on the shaft 26. A spring 31 surrounds the rod 29 and is confined between the arm 30 and nuts 32 on the rod. The arm 30 carries a cam roll 33 which is held by a clamp spring (not shown) connected to the arm 30 and bracket 27 against a cam 34 fixed on a shaft 35 rotatably mounted in bearings on the bracket 27. The cam 34 has four depressions and the arrangement is such that when the cam roll 33 is in one of the depressions the clamp 19 will be raised by the above-mentioned clamp spring while if the cam is rotated one-eighth of a revolution the high part of the cam will cause the clamp to be pressed down on to the sole. The spring 31 provides a yield between the arms 25 and 30 and thereby allows for different thicknesses of soles.

The operating mechanism for the clamp is as follows: Fixed also on the shaft 35 and rotating with it and the cam 34 is a ratchet wheel 36 having eight teeth which is rotated one-eighth of a revolution to lower the clamp on to the sole by a pin 36* fixed in an arm 37 pivotally supported by an arm 38 pivoted on a shaft 39 fixed in a bracket 40 fixed to the frame 3. The pin is held against the ratchet wheel by a tension spring (not shown) connected at its ends respectively to the arm 37 and arm 38, the construction permitting it to follow the wheel 36 back and forth as the slide 17 moves, carrying the wheel 36 with it. The arm 38 is connected at 40* to the lower end of a rod 41 which at its upper end is connected to a lever 42 pivoted at 43 to a bracket 44 fixed on one of the cross-head guide rods 45. The lever 42 has formed on it the control handle 20 by which it may be actuated to raise the arm 38 and through the pin 36* in the arm 37 rotate the ratchet wheel and cam 34 one-eighth of a revolution to lower the clamp on to the sole. The cam 34 is rotated to allow the clamp to be raised by its clamp spring by a pin 46* fixed in an arm 47 pivoted at 48 to a bracket 49 fixed to the crosshead 6. As the lower mold carriage or slide 17 and with it the ratchet wheel and cam move forwardly (relatively to the cross-head 6) or to the left in Fig. 1, after the sole is molded, the pin in the arm 47 catches a tooth on the ratchet wheel and rotates it and the cam through another one-eighth of a revolution thereby bringing one of the depressions in the cam opposite the cam roll 33 and allowing the clamp to be raised by the clamp spring.

It will be understood that while there is a ratchet wheel 36 and mechanism driven thereby associated with each sole clamp there is but a single arm 37 carrying the ratchet wheel operating pin 36* the opposite ends of which latter are in turn effective to operate that one of the ratchet wheels of the mold slide that for the time being is in the forward position. In other words the one handle 20 is operative to lower the respective clamps in turn.

In order to permit each clamp to remain in operation as the corresponding molds close together, a longitudinal slot 50 is provided in the lower rear end of the substantially full length upper mold 1, which is just wide enough to receive the sole clamp 19 when the molds close upon the sole (Figs. 2 and 3); and it is also arranged that the end gage 18 shall automatically retire as the molds close upon the sole, to avoid interference with a full length upper mold. It will be obvious that the same molds can thus be used to mold all or part of a whole sole, or a short sole, by proper adjustment of the gage 18.

To effect the automatic withdrawal of the end gage 18 there is provided an extensible connection between the gage 18 and the customary handle 51 at the front of the machine by which the gage has been adjusted longitudinally of the sole. This connection is generally of the type shown in United States Letters Patent No. 1,271,315, granted July 2, 1918, on the application of J. J. Heys, wherein the connection merely adjusts the gage. The illustrated mechanism provides in addition for retracting the gage without losing the adjustment or disturbing the said handle. This connection is as follows:—The gage adjusting handle 51 controls (through a pinion and rack such as shown in the patent just mentioned) the longitudinal position of a rack bar 52 (Fig. 4) arranged to slide forward and backward in the crosshead 6, and meshing with a gear segment 53, rotatably mounted on a shaft 59, which is itself rotatably mounted in the slide 17. A second gear segment 57 is fixedly mounted on this shaft and meshes with a rack 58 on the gage-carrying bar 23. The segment 53 carries a laterally projecting lug or stop face 54, and the segment 57 has a similar lug 56, so placed as to contact with the lug 54 when the segments are relatively turned to the right extent. A coil spring 55 having one end connected to each segment tends to turn the segment 57 counterclockwise (Fig. 4) relatively to the segment 53 until the lugs 54, 56 contact. The handle 51 by operating the bar 52 will thus rotate both segments and move the rack 58 and adjust the gage 18, the lugs remaining in contact. A third segment, 60 (Fig. 1), about which is wrapped a chain 61 secured at one end to the segment and at the other end to the crosshead 6 on which the carriage 17 slides to and fro, is fixed on the shaft 59, to withdraw the gage, as will be seen.

The spring 55 always tends to hold the two stop faces 54, 56 together and the gage 18 in its forward adjusted position when the carriage 17 is forward, but as the carriage retires the slack in the chain 61 is taken up, and the pull of the chain then causes the rotation of the third segment 60 which turns the shaft 59 and segment 57 and withdraws the gage 18 rearwardly on the carriage, separating the stop faces on the segments and retracting the gage always to a fixed position on the carriage, determined by the length of the chain 61. The clamp bar 24, when the clamp is not in operative position on the sole, is adjusted with the gage by means of an upstanding pin 62 on the rear end of the gage bar 23, which when the clamp 19 is raised from the lower mold, and its rear end lowered, enters snugly a hole 63 in the rear end of the clamp bar 24 which latter is freely slidable longitudinally in the device or arm 25 which swings it up and down out of and into contact with the sole. Consequently the clamp bar, when its rear end is down, is carried longitudinally to and fro with the gage in the adjustment of the gage; so as never to project forwardly more than a given amount beyond the gage.

As the clamp 19 is lowered upon the sole by the turning of the cam 34, the pin 62 and the hole 63 part company, so that the clamp will not be drawn back as the gage 18 is automatically retracted in the manner above described. In order that this disconnection of the clamp from the pin 62 shall not leave the clamp bar 24 freely slidable longitudinally in the arm 25 and therefore liable to displacement, there are provided a pair of pawls 65 (Figs. 6 and 7) pivoted in the rectangular end 28 of the rod 29 and controlled by two spring plungers 66, these pawls being arranged to engage teeth 67 on the clamp bar 24. The pawls are duplicated for greater precision, being spaced apart a distance less than the distance between adjacent teeth, so that one or the other of them will act to lock the clamp bar against lengthwise movement when it is disconnected from the pin 62. When the clamp is lifted from the sole after the molding and is connected again to the pin 62, the pawls are retracted from the teeth 67 by the engagement of tails 68 thereon with a face on the bracket 27 in response to the turning movement of the arm 30 in a clockwise direction (Fig. 2).

To reduce the amount of widthwise slotting of the upper mold 1 to receive the clamp, the latter has but a single work-engaging foot the grip of which on the work is increased by serrations (not shown) on its comparatively large work-engaging face 64, and this makes it desirable that the clamp be positioned near the rear end of the sole in order that the portion of the sole engaged by the clamp may not be exposed in the finished shoe.

The molds are positioned in the machine by locating stops or the like (not shown) and are formed with relation to the faces on them which engage the stops in such a way that the ball line of different molds always occupies about the same position fore and aft of the machine. To avoid excessive lengthwise slotting of the upper mold 1 (as the mold length increases, Fig. 2 showing a short mold), to receive the clamp 19, varying lengths of slot which in no case extends unnecessarily far forward on any size of mold are adopted, and this renders desirable the adoption of some means to ensure automatically that when a change of molds is effected the clamp 19 is so positioned relatively to the slot (the position of which may vary considerably lengthwise of the carriage with different molds) as to ensure its being free to enter the slot if the machine is started without the insertion of a sole and proper adjustment of the gage and clamp thereto, after the substitution of a longer mold for a shorter one. This result is secured by providing a stop pin 69 depending from the gage bar 23 and in the path of the lower mold 2 on the carriage, so that, in the case of a longer mold than that shown, a lug 169 formed on the end of the mold will strike the end of the pin 69 if it (and therefore the gage and clamp) is too far forward when the new mold is placed in position in the machine. The pin 69, and consequently the gage bar 23 and the clamp bar 24, are then pushed back, (the stop faces 54, 56 of the gage adjusting mechanism parting company), to a position determined by the position to which the lug 169 on the mold extends rearwardly on the carriage—a position determined (in the making of the mold) with reference to the position of the mold locating face on the mold and with reference to the length of the slot in the corresponding upper mold of the pair. This rotates the segment 57, shaft 59 and segment 60 and slacks up the chain 61 a little more, and the retractile movement of the gage caused by the chain will begin correspondingly later in the cycle than if a shorter mold were in the machine. The gage will, however, always be retracted ultimately to the same point. It will be understood, as above described, that the end gage is so fashioned and mounted that it can be adjusted well forward over the lower mold to be effective to position a short sole on a mold that is adapted to mold a whole sole. See the dotted line structure in Fig. 2.

The handle 20 which is lowered to bring the clamp 19 down upon the sole is also coupled to the clutch mechanism so that its further depression after the clamp has engaged the sole trips the machine clutch. See Fig. 1. For this purpose the single arm 38 has pivotally connected to it a link 70 which is connected at its lower end to an arm 71 of a bell-crank lever which is pivoted at 72 to a bracket 73 fixed on the cross-head guiding rod 45. A second arm 74 of the bell-crank lever has pivotally connected to it one end of a bar 75 the other end of which rests on a block 76 fixed by a screw 77 to an arm 78 pivoted at 79 to the bracket 73. The block 76 has fixed to it a plate 80 which, when the machine is stopped, supports a plate 81 fixed to a block 82 through which the arm 78 passes. The block 82 has fixed to it the upper end of a rod 83 the lower end of which is connected to a clutch controlling bar 84. One end of the bar 84 is supported by an arm 85 fixed on a shaft 86 rotatably mounted in bearings on the frame 3 and the other end of the bar is connected to a clutch lever pivoted on the frame. Endwise movement of the bar 84 under the influence of a spring 87 connected to the frame and to an arm 88 fixed on the shaft 86 closes the clutch. When the handle 20 of the lever 42 is depressed the bar 75 is pushed along over the top of the block 76 against the side of a leftwardly projecting shelf (Fig. 1) on the plate 81 and releases the plate from the plate 80 and allows the rod 83 to drop and the spring 87 to close the clutch. At this time the arm 78 is resting on one of two cams 89, 89 on the crank-shaft 9 and as the shaft rotates the arm is lowered until the plate 81 is pulled by a spring 90 connected to the blocks 76, 82 over the plate 80 again and as the shaft 9 continues to rotate the arm 78 is again raised thereby raising the block 82 and opening the clutch. It should be pointed out that endwise movement of the bar 84 to close the clutch is owing to the swinging movement of the arm 85 accompanied by downward movement of the bar so that an upward pull on the rod 83 can open the clutch. It will thus be seen that when the clutch is closed the shaft 9 will make half a revolution to separate one pair of molds and close the other pair. Should the hand lever 20 be held in its depressed position the re-engaging movement of the members 81 and 80 carries the leftwardly projecting shelf shown in Fig. 1 on the plate 81 under the bar 75 and thus the bar 75 will be raised by the plate 81 as it is raised and the hand lever must be raised to retract the bar 75 before the clutch can again be closed.

The operation of the machine is as follows:—The operator places a sole on the lower mold in proper position against the gage 18 and pulls down the handle 20. This pulls the toothed wheel 36 around one tooth, turning the cam 34, and drops the clamp 19 on to the sole, disengaging it from the pin 62, and starts the machine by pushing the plate 81 off from the plate 80. The lower mold then rises and moves back, carrying its associated mechanism, the chain 61 rotating the shaft 59 and segment 57 and pulling the gage back. As the molds close together, the pin 46* slips over a tooth of the wheel 36. The block 82 is raised by the arm 78 and the machine stops. The operator removes the molded sole from the other side of the machine, puts in a new one, and pulls the handle 20 again. The above described cycle is repeated on the other side of the machine, and the lower mold carrying the first sole descends and comes forward. The arm 47 pulls around the toothed wheel 36 one tooth and raises the clamp, the gage 18 moving forward again under the pull of the spring 55 as the chain 61 slacks off until the pin 62 falls into the hole 63 and the stops 54, 56 come together, thus locating the gage and clamp for engaging a new sole.

Having described our invention, what we claim as new and desire to secure by Letters Patent of the United States is:—

1. A sole pressing machine having a pair of co-operating molds, means for relatively moving the molds to compress a sole between them, means to clamp a positioned sole for action of the molds thereon by engagement of the sole within the area thereof which is to be molded, gaging means for the sole, and means for retracting the gaging means as the molds close together.

2. A sole pressing machine having a pair of co-operating molds, means for relatively moving the molds to press a sole between them, sole-gaging means, and clamping means for engaging a sole prior to said relative movement, and for holding the sole in position for action of the molds thereon, said clamping means being adjustable with the engaging means to operate at different positions lengthwise of the sole.

3. A sole pressing machine having a pair of co-operating molds, means for relatively moving the molds to press a sole between them, sole gaging means and clamping means operable prior to said relative movement to press the sole against one of the molds to hold it in proper position, said clamping means being adjustable with the gaging means to operate at different positions lengthwise of the mold with which it co-operates.

4. A sole pressing machine having a pair of cooperating molds arranged to press a sole between them, gaging means to locate the sole in position for action of the molds thereon, and clamping mechanism for holding the sole in such position, the clamping mechanism and gaging means being arranged for simultaneous adjustment longitudinally of the sole and being also arranged to permit the retraction of the gaging means, as the molds close together, without disturbance of the clamping mechanism.

5. A sole pressing machine having a pair of cooperating molds arranged to press a sole between them, gaging means for locating the sole in position for action of the molds thereon, and clamping mechanism for holding the sole in such position, the clamping mechanism and gaging means being arranged for simultaneous adjustment longitudinally of the sole and being also arranged to permit the retraction of the gaging means, as the molds close together, without disturbance of the clamping mechanism, and to return to adjusted position upon the sole releasing movement of the molds.

6. A sole pressing machine comprising a pair of relatively movable molds adapted to mold a sole between them, and an end gage arranged to locate the end of the sole with regard to one of the molds and constructed and arranged to be displaced relatively to the sole as the molds close together.

7. A sole pressing machine comprising a pair of cooperating molds arranged to compress a sole between them, means for relatively moving said molds to press the sole, an end gage arranged to locate the end of the sole relatively to one of the molds, and means operated by the relative movement of the molds in closing together to displace the gage from operative position at the end of the sole to avoid interference thereof with the molds as they close together.

8. A sole molding machine having a pair of co-operating molds arranged to compress a sole between them, a sole clamp and a sole gage generally adjustable lengthwise of the sole, the gage being arranged for movement away from the molds as the molds come together, and the connection between the clamp and gage being constructed and arranged to permit the clamp to remain in operative clamping position as the gage is retracted.

9. In a sole molding machine, a pair of co-operating molds arranged to clamp a sole between them, an end gage arranged to position the sole with regard to one of the molds, means for adjusting the gage longitudinally of the mold to correspond with soles of varying sizes, and means for retracting the gage from the sole as the molds come together while preserving the adjustment.

10. In a sole molding machine, a pair of cooperating molds arranged to clamp a sole between them, a gage arranged to position the sole with regard to one of the molds, means including a lost motion mechanism for adjusting the gage back and forth to correspond to soles of varying sizes, and means operated by relative movement of the molds to operate the lost motion mechanism to move the gage out of operative position.

11. A sole molding machine having a gage and a clamp for a sole jointly adjustable lengthwise of the sole, and means for breaking the connection between the gage and clamp during operation of the machine to permit the gage to retire from the path of a mold while leaving the clamp in adjusted position.

12. A sole molding machine having mold holding devices for interchangeable pairs of co-operating molds, sole positioning means that is adjustable relatively to said devices lengthwise of the molds according to variations in the work to be molded by a particular pair of molds, and means acted on by one of the molds to determine that the positioning means shall in no case take up a position too far between the molds.

13. A sole pressing machine having a pair of co-operating molds arranged to mold a sole over its entire length, means for relatively moving the molds to compress a sole between them, means to clamp a positioned sole for action of the molds thereon by engagement of the sole within the area thereof which is to be molded, end gaging means for the sole, and means for retracting the end gaging means as the molds close together.

14. A sole pressing machine having a pair of co-operating molds, means for relatively moving the molds to press a sole between them, manually operable clamping means operable to hold the sole relatively to a mold prior to the actuation of the machine, and gaging mechanism, adjustable with the clamping means, for positioning the sole relatively to the mold.

15. A sole pressing machine having a pair of co-operating molds, means for moving one of the molds into operative relation to the other to press a sole between them, and sole gaging and sole clamping means mounted to move with the moving mold to gage and hold the sole on it, said gaging and clamping means being simultaneously adjustable to preserve their own operative relation.

16. A sole pressing machine comprising a pair of co-operating molds arranged to press a sole between them, means for relatively moving said molds to press the sole, an end gage arranged to locate the end of the sole relatively to one of the molds, and means for moving the gage, in the plane of the sole, away from the sole as the molds close together.

17. A sole pressing machine comprising a pair of co-operating molds arranged to press a sole between them, means for relatively moving said molds to press the sole, an end gage arranged to locate the end of the sole relatively to one of the molds, and means operated by the relative movement of the molds in closing together for moving the gage, in the plane of the sole, away from the sole as the molds close together.

18. In a sole pressing machine, a sole gage carrying member, and a sole gage on said member having a plurality of gaging surfaces and arranged to have different operative positions corresponding respectively to the said surfaces, whereby the desired surface can be brought into gaging position against a sole.

19. A sole-pressing machine having, in combination, a pair of co-operating molds, means for relatively moving said molds to compress a sole between them, means for clamping the sole for the molding operation by engaging it within the area thereof which is to be molded, the molds and the clamping means being so constructed and arranged as to prevent interference between them in the relative pressing movement of the molds, an end gage arranged to be positioned over the molding face of one of the molds to position the sole, and automatic means for retracting the gage from over said face in the molding operation.

In testimony whereof we have signed our names to this specification.

REGINALD BOYD WOODCOCK.
ERNEST HOPE.